United States Patent
Potts

(10) Patent No.: US 7,903,692 B2
(45) Date of Patent: *Mar. 8, 2011

(54) DEVICES, SYSTEMS AND METHODS FOR DELIVERING TEXT MESSAGES

(75) Inventor: Karl W. Potts, Birmingham, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/466,407

(22) Filed: May 15, 2009

(65) Prior Publication Data

US 2009/0221311 A1    Sep. 3, 2009

Related U.S. Application Data

(63) Continuation of application No. 10/255,888, filed on Sep. 26, 2002, now Pat. No. 7,535,922.

(51) Int. Cl.
*H04M 1/64* (2006.01)

(52) U.S. Cl. .................. 370/493; 379/88.11; 379/88.12; 370/487

(58) Field of Classification Search .................. 370/465, 370/493, 487; 379/88.01, 67.1, 88.17, 88.25, 379/88.12, 88.11; 455/567, 414.1, 404.1
See application file for complete search history.

(56) References Cited

U.S. PATENT DOCUMENTS

| | | | |
|---|---|---|---|
| 4,166,929 A | 9/1979 | Sheinbein | |
| 4,582,956 A | 4/1986 | Doughty | |
| 4,959,855 A | 9/1990 | Daudelin | |
| 5,029,200 A | 7/1991 | Haas et al. | |
| 5,155,761 A | 10/1992 | Hammond | |
| 5,309,413 A | 5/1994 | Chan | |
| 5,438,568 A | 8/1995 | Weisser, Jr. | |
| 5,511,111 A | 4/1996 | Serbetcioglu et al. | |
| 5,572,583 A | 11/1996 | Wheeler, Jr. et al. | |
| 5,748,710 A | 5/1998 | Lautenschlager | |
| 5,825,855 A | 10/1998 | Astarabadi | |
| 5,859,902 A | 1/1999 | Freedman | |
| 5,896,442 A | 4/1999 | Song et al. | |
| 5,898,917 A | 4/1999 | Batni et al. | |
| 5,943,409 A | 8/1999 | Malik | |
| 5,991,364 A | 11/1999 | McAllister et al. | |
| 6,021,178 A | 2/2000 | Locke et al. | |
| 6,035,031 A | 3/2000 | Silverman | |
| 6,041,103 A | 3/2000 | La Porta et al. | |
| 6,047,255 A | 4/2000 | Williamson | |
| 6,088,337 A | 7/2000 | Eastmond et al. | |
| 6,104,786 A | 8/2000 | Gibilisco et al. | |
| 6,148,285 A | 11/2000 | Busardo | |
| 6,178,240 B1 | 1/2001 | Walker et al. | |
| 6,212,268 B1 | 4/2001 | Nielsen | |
| 6,349,206 B1* | 2/2002 | Reichelt et al. ............... 455/421 |

(Continued)

OTHER PUBLICATIONS

A Hybrid Voice/Text Electronic Mail System: An Application of the Integrated Services Digital Network by Andrew McBride; Mar. 1994.*

(Continued)

*Primary Examiner* — Salman Ahmed

(74) *Attorney, Agent, or Firm* — Thomas, Kayden, Horstemeyer & Risley, LLP

(57) ABSTRACT

A network switch. The network switch includes a processor configured to execute a set of instructions to access a recorded announcement with attendant text and to transmit the recorded announcement with the attendant text to a telecommunications device.

20 Claims, 10 Drawing Sheets

U.S. PATENT DOCUMENTS

| | | | |
|---|---|---|---|
| 6,408,062 B1 | 6/2002 | Cave | |
| 6,434,138 B2 | 8/2002 | Kersken et al. | |
| 6,477,374 B1 | 11/2002 | Shaffer et al. | |
| 6,504,910 B1 | 1/2003 | Engelke et al. | |
| 6,522,342 B1 | 2/2003 | Gagnon et al. | |
| 6,658,106 B1 | 12/2003 | Atkinson et al. | |
| 6,687,339 B2 | 2/2004 | Martin | |
| 6,931,007 B2 | 8/2005 | Jones | |
| 6,961,559 B1 | 11/2005 | Chow et al. | |
| 6,985,864 B2 | 1/2006 | Nagao | |
| 7,027,570 B2 | 4/2006 | Pines et al. | |
| 7,039,168 B1* | 5/2006 | Potts | 379/88.25 |
| 7,185,221 B1 | 2/2007 | Kamel | |
| 7,251,318 B1 | 7/2007 | Henderson | |
| 7,474,738 B1* | 1/2009 | Potts et al. | 379/76 |
| 7,535,922 B1* | 5/2009 | Potts | 370/465 |
| 2002/0171552 A1* | 11/2002 | Tate | 340/573.1 |
| 2002/0193983 A1 | 12/2002 | Tokieda et al. | |
| 2003/0081752 A1 | 5/2003 | Trandal et al. | |
| 2003/0128821 A1* | 7/2003 | Luneau et al. | 379/88.21 |
| 2003/0169182 A1* | 9/2003 | Wilhelm et al. | 340/905 |
| 2004/0215793 A1* | 10/2004 | Ryan et al. | 709/229 |
| 2004/0247093 A1 | 12/2004 | Potts et al. | |
| 2005/0055212 A1 | 3/2005 | Nagao | |
| 2005/0068567 A1* | 3/2005 | Hull et al. | 358/1.15 |
| 2005/0096095 A1 | 5/2005 | Benco et al. | |
| 2005/0249335 A1 | 11/2005 | Rice et al. | |
| 2006/0046686 A1 | 3/2006 | Hawkins et al. | |
| 2006/0189327 A1 | 8/2006 | Zellner et al. | |
| 2006/0223492 A1 | 10/2006 | Chin et al. | |
| 2006/0253281 A1* | 11/2006 | Letzt et al. | 704/231 |
| 2007/0047520 A1* | 3/2007 | Byers et al. | 370/352 |
| 2007/0103317 A1 | 5/2007 | Zellner et al. | |
| 2008/0089488 A1 | 4/2008 | Brunson et al. | |
| 2008/0298570 A1* | 12/2008 | Wang | 379/142.01 |
| 2009/0046840 A1* | 2/2009 | Luneau et al. | 379/142.04 |
| 2009/0132075 A1* | 5/2009 | Barry | 700/94 |
| 2010/0008512 A1* | 1/2010 | Packer et al. | 381/57 |
| 2010/0054427 A1* | 3/2010 | Luneau | 379/48 |
| 2010/0146057 A1* | 6/2010 | Abu-Hakima et al. | 709/206 |

OTHER PUBLICATIONS

POTTS, Notice of Allowance and Fees Due mailed Jan. 9, 2009 for U.S. Appl. No. 10/255,888, filed Sep. 26, 2002 (Copy not provided as PTO generated).

POTTS; Final Rejection mailed Apr. 20, 2007 for U.S. Appl. No. 10/255,888, filed Sep. 26, 2002 (Copy not provided as PTO generated).

POTTS; Final Rejection mailed Jul. 18, 2008 for U.S. Appl. No. 10/255,888, filed Sep. 26, 2002 (Copy not provided as PTO generated).

POTTS; Final Rejection mailed Dec. 20, 2007 for U.S. Appl. No. 10/255,888, filed Sep. 26, 2002 (Copy not provided as PTO generated).

POTTS; Non-Final Rejection mailed Feb. 20, 2008 for U.S. Appl. No. 10/255,888, filed Sep. 26, 2002 (Copy not provided as PTO generated).

POTTS; Non-Final Rejection mailed Aug. 31, 2007 for U.S. Appl. No. 10/255,888, filed Sep. 26, 2002 (Copy not provided as PTO generated).

POTTS; Non-Final Rejection mailed Dec. 27, 2006 for U.S. Appl. No. 10/255,888, filed Sep. 26, 2002 (Copy not provided as PTO generated).

POTTS; U.S. Appl. No. 10/255,888, filed Sep. 26, 2002 (Copy not provided as part of related application filing).

Dale, Summarising Company Anouncements; Natural Language Processing and Knowledge Engineering, 2005; IEEENPL-KE '05; Proceedings of 2005 IEEE Conference on Oct. 30-Nov. 1, 2005; pp. 651-656.

Holder; U.S. Appl. No. 10/207,586, filed Jul. 29, 2002.

Holder; U.S. Appl. No. 10/211,210, filed Aug. 2, 2002.

Scott; U.S. Appl. No. 10/370,643, filed Feb. 2, 2003.

Yoo, "TDX-10 Recorded Announcement System using ADPCM Coding Technique" Fourth IEEE Region 10 International Conference Nov. 1989: pp. 694-696.

POTTS; U.S. Appl. No. 10/073,238, filed Feb. 13, 2002.

POTTS; U.S. Appl. No. 10/150,100, filed May 20, 2002.

* cited by examiner

DEVICES, SYSTEMS AND METHODS FOR DELIVERING TEXT MESSAGES

CROSS REFERENCE

This application is a continuation of copending U.S. Ser. No. 10/255,888, entitled, "Devices, Systems and Methods for Delivering Text Messages," filed Sep. 26, 2002, which is entirely incorporated herein by reference.

BACKGROUND

The present application is directed, in general, to devices, systems, and methods for delivering text messages to telecommunications devices.

When a calling party or called party is using a wireless or wireline service, the party often encounters recorded announcements that inform the party about call conditions (e.g. out-of-service numbers, changed area codes, etc.) or that instruct the party in the use of certain business features.

Numerous businesses use recorded announcements to convey information to their customers via communication networks. The use of recorded announcements is widespread and rapidly growing in today's global economy. For example, most, if not all, telecommunication companies use hundreds of recorded announcements to notify callers of, for example, call status, service status, available services, employment opportunities, and account balances. Similarly, banking service providers use thousands of recorded announcements to inform customers of, for example, account status, lending opportunities, payment options, credit rates, billings, and various other services. Most establishments use recorded announcements to route calls, receive automated purchase information, generate sales, perform sales promotions, and provide other automated customer services. Polling services use recorded announcements to respond to calls, issue questions to callers, and generate responses to data entered by callers. Hospitals, governmental agencies, and other large entities often employ recorded announcements both internally and externally for processing applications with callers. As yet another example, many airline service providers use hundreds of recorded announcements to inform passengers of flight status, ticket information, and flight information. The travel services industry is another business sector that utilizes systems with recorded announcements. Most travel agencies, car rental companies, and hotels handle transactions with recorded announcements. Many companies use "in-house" communication systems with "pick up" phones that play announcements when a user picks up the telephone (e.g., a car rental agency or hotel with a "pick up" telephone at a front desk or reception counter).

Recorded announcements have been conventionally played as audio signals; however, many calling parties and called parties may not be able to audibly comprehend a recorded announcement. For example, many calling parties or called parties, who are hearing impaired, are not able to understand an audible announcement. Such parties may choose to use a special TDD device, which interprets tones that are often transmitted with the recorded announcements and which displays each tone as a text message showing an abbreviated version of the recorded announcement. However, not all hearing impaired parties may have access to TDD devices because, for example, TDD devices may not be compatible with the mobility of wireless services or many wireline callers or called parties may simply prefer not to use a TDD device, thus causing a caller or a called party with a hearing impediment to not comprehend or fully appreciate many recorded announcements.

In addition, a calling party or a called party may not be a person, but rather may be a device such as a facsimile machine, pager, modem, etc., many of which are incapable of discerning and/or storing an audible message.

SUMMARY

In one embodiment, the present invention is directed to a network switch. The network switch includes a processor configured to execute a set of instructions to access a recorded announcement with attendant text and to transmit the recorded announcement with the attendant text to a telecommunications device.

In one embodiment, the present invention is directed to a service node. The service node includes a database that contains a plurality of recorded announcements and a plurality of phrases of the recorded announcements. The service node also includes a processor configured to execute a set of instructions to access the recorded announcements.

In one embodiment, the present invention is directed to a telecommunications system. The telecommunications system includes a network switch and a processor in communication with the network switch. The processor is configured to execute a set of instructions for accessing a recorded announcement with attendant text and transmitting the recorded announcement with the attendant text to a telecommunications device.

In one embodiment, the present invention is directed to a method of delivering a text message of a recorded announcement to a telecommunications device. The method includes interpreting a call scenario, determining if the recorded announcement is needed, accessing the recorded announcement with the text message, and transmitting the recorded announcement with the text message to the telecommunications device.

In one embodiment, the present invention is directed to a computer readable medium having stored thereon instructions which, when executed by a processor, cause the processor to interpret a call scenario, determine if a recorded announcement is needed, access the recorded announcement with attendant text, and transmit the recorded announcement with the attendant text to a telecommunications device.

BRIEF DESCRIPTION OF THE DRAWINGS

Further advantages of the present invention may be better understood by referring to the following description taken in conjunction with the accompanying drawings, in which.

DESCRIPTION

It is to be understood that the figures and descriptions of the present invention have been simplified to illustrate elements that are relevant for a clear understanding of the present invention, while eliminating, for purposes of clarity, other elements of a conventional telecommunications network. For example, certain operating system details and modules of certain of the intelligent platforms of the network are not described herein. Those of ordinary skill in the art will recognize, however, that these and other elements may be desirable in a typical telecommunications network. However, because such elements are well known in the art, and because they do not facilitate a better understanding of the present invention, a discussion of such elements is not provided herein.

The term "calling party" is used herein generally to refer to the person or unit that initiates a telecommunication. The calling party may also be referred to herein as "caller." In some cases, the calling party may not be a person, but may be a device such as a facsimile machine, a pager, a modem, etc. The terms "called party" and "user" are used herein generally to refer to the person or unit that answers or responds to the call or communication. The term "communication" is used herein to include all messages or calls that may be exchanged between a calling party and a called party, including, but not limited to, voice, data and video messages. The term "communication" is used synonymously herein with the term "call" unless a distinction is noted. The term "subscriber" is used herein to generally refer to a subscriber of the described telecommunications service.

The present invention, in various embodiments, enables either a calling or a called party of a telecommunications device to receive a recorded announcement in the form of a text message in place of, or in addition to, an audible announcement, thus enabling a calling or a called party, which is not capable of audibly discerning and/or storing a message, to receive and comprehend a recorded announcement without the use of a TDD device, audio equipment, or any auditory senses.

Figure 1:
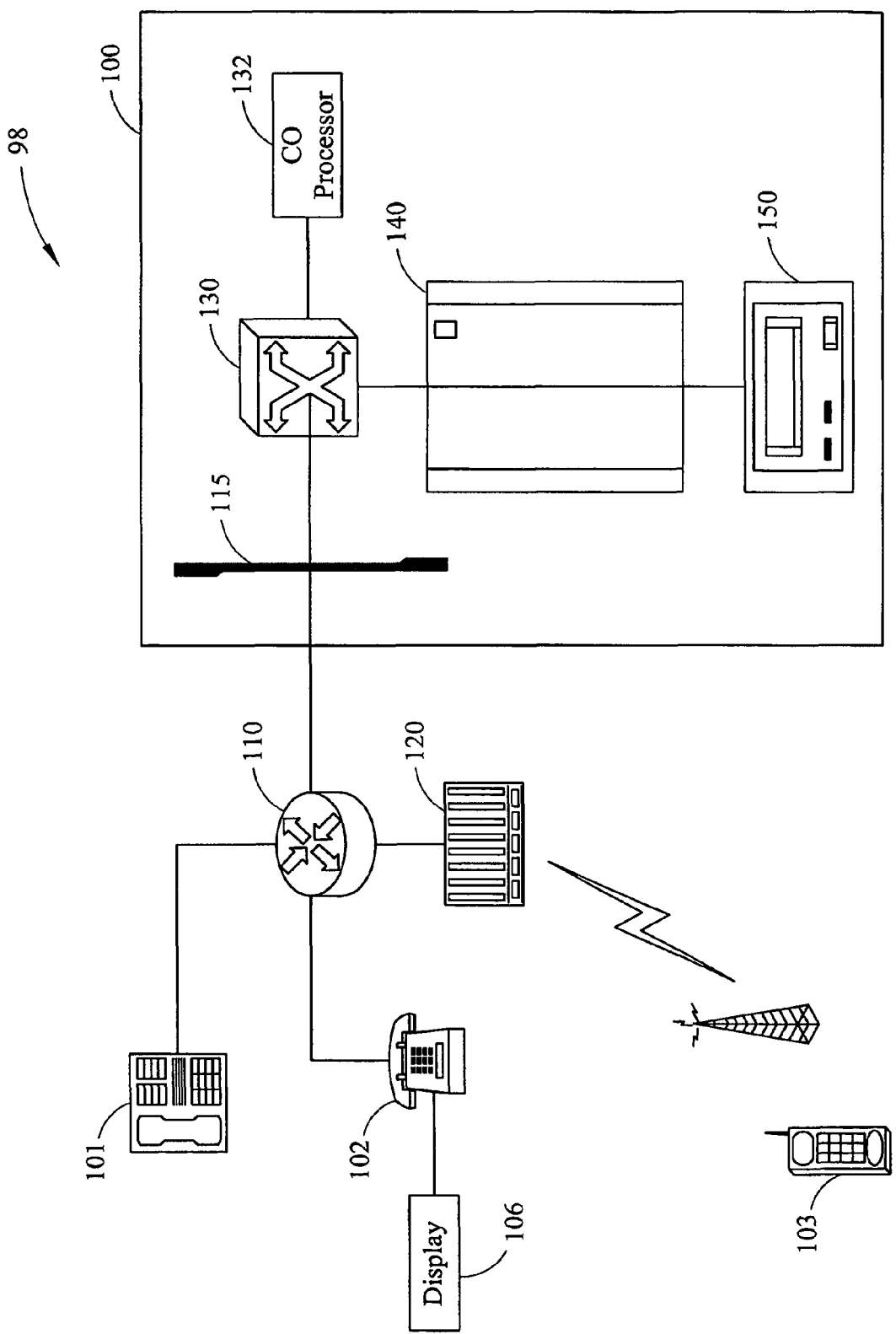
FIG. 1 is a block diagram of a system according to one embodiment of the present invention.

FIG. 1 is a block diagram of a telecommunications system 98 according to one embodiment of the present invention. Recorded announcements have been prepared to provide information to callers regarding the condition of network facilities, use of calling services and other matters. For each audio recorded announcement, a text message is assembled that represents the audio message. The text message could be, for example, the entire audio message or an abbreviated version, which could fit the display screen of telecommunication devices 101.

In this example, subscribers of a telephone service provider access specific recorded announcements coupled to trunks in a central office 100. For example, a caller using a telecommunications device 101 dials a code, e.g., "1+" or "800", that causes a trigger in router 110 or in the central office 100 to initiate a query for a recorded announcement from recorded announcement equipment 150. Similarly, in another example, a caller using a telecommunications device 102 dials a defined service number and router 110, recognizing the number, routes the call to an automated attendant function at central office 100. In another example, based on a sudden service outage for cellular calls in a certain region, a caller using a telecommunications device 103 is identified as a cellular call by the network and routed to central office 100 via mobile telephone switching office (MTSO) 120 to receive service information, i.e., recorded announcements concerning the sudden service outage.

Thus, telecommunications devices 101, 102, 103 are connected to a central office 100 through a router 110, a distributing frame 115 and into a switch network 130. In this example, a user of telecommunications device 101 has dialed a number that requires a recorded announcement from the central office 100. A central office (CO) processor 132, which may be located on or next to switch 130, may initiate a query and decide what announcement(s), if any, is (are) needed. After recognizing that telecommunications device 101 requires a recorded announcement, the CO processor 132 may connect the line through the switch network 130 to a trunk circuit 140 that is in communication with recorded announcement equipment 150.

In one embodiment of the present invention, the recorded announcement equipment 150 stores an audio signal of a voice file, which represents the spoken words of the recorded announcement. Hereafter, the audio signal of the voice file will be referred to as an audio signal. In other embodiments, the recorded announcement equipment 150 may store, in addition to or in place of the audio signal, an audio signal comprising a Frequency Shift Keying (FSK) signal of ASCII binary characters that represent the text message of the recorded announcement and that are capable of being displayed by telecommunications devices 101, 102, 103 in the form of a text message. Frequency Shift Keying (FSK) is a modulation technique that transmits data in digital format over an analog carrier by shifting the frequency of the carrier and is similar to the process used in a caller id service to transmit caller identification information. In another embodiment of the invention, the text message for each announcement may be stored in its entirety with the recorded announcement or separately from it. In other embodiments of the invention, the text message of the recorded announcement is assembled from available words and phrases that are stored on the recorded announcement equipment 150. In yet other embodiments, the text message could be either the entire audio message or an abbreviated version, which could fit the typical display screen of the telecommunication devices 101, 102, 103. Hereafter, the audio signal comprising the FSK signal of ASCII binary characters that represent the text message will be referred to as a text signal.

In one embodiment of the present invention, the CO processor 132 executes programmable applications to access the audio signal and/or the text signal that are stored in the recorded announcement equipment 150 and connects these signals to the switch network 130.

The switch network 130 may then route the audio signal to telecommunications device 101, and, in one embodiment, the audio signal may include a tone that precedes the text signal and indicates to the telecommunications device 101 that a text message should be displayed. The switch network 130 may also route the text signal in which the telecommunications device 101 will receive, convert the signal into a series of readable characters, and ultimately display the recorded announcement in the form of a text message. The means by which telecommunications devices 101, 102, 103 receive, convert, and display the text signal as a text message are further described in more detail herein.

The architecture of central office 100 may be repeated in one or more central offices throughout a network, and the number and sizes of the central offices may vary, depending upon the size of the overall system and other considerations. In addition, the provisioning of recorded announcements is the subject of related co-pending application Ser. No. 10/150, 100, titled "System, Method, and Apparatus for Provisioning Recorded Announcements", which is hereby incorporated by reference in its entirety.

It can be understood that there are many variations of the system illustrated in FIG. 1. For example, recorded announcement equipment 150 may be configured to receive and store an FSK modulated signal. Alternatively, recorded announcement equipment 150 may comprise or be interfaced with a processor capable of encoding a text message into ASCII binary characters and converting the ASCII binary characters into an FSK signal, which is then stored.

Figure 2A:
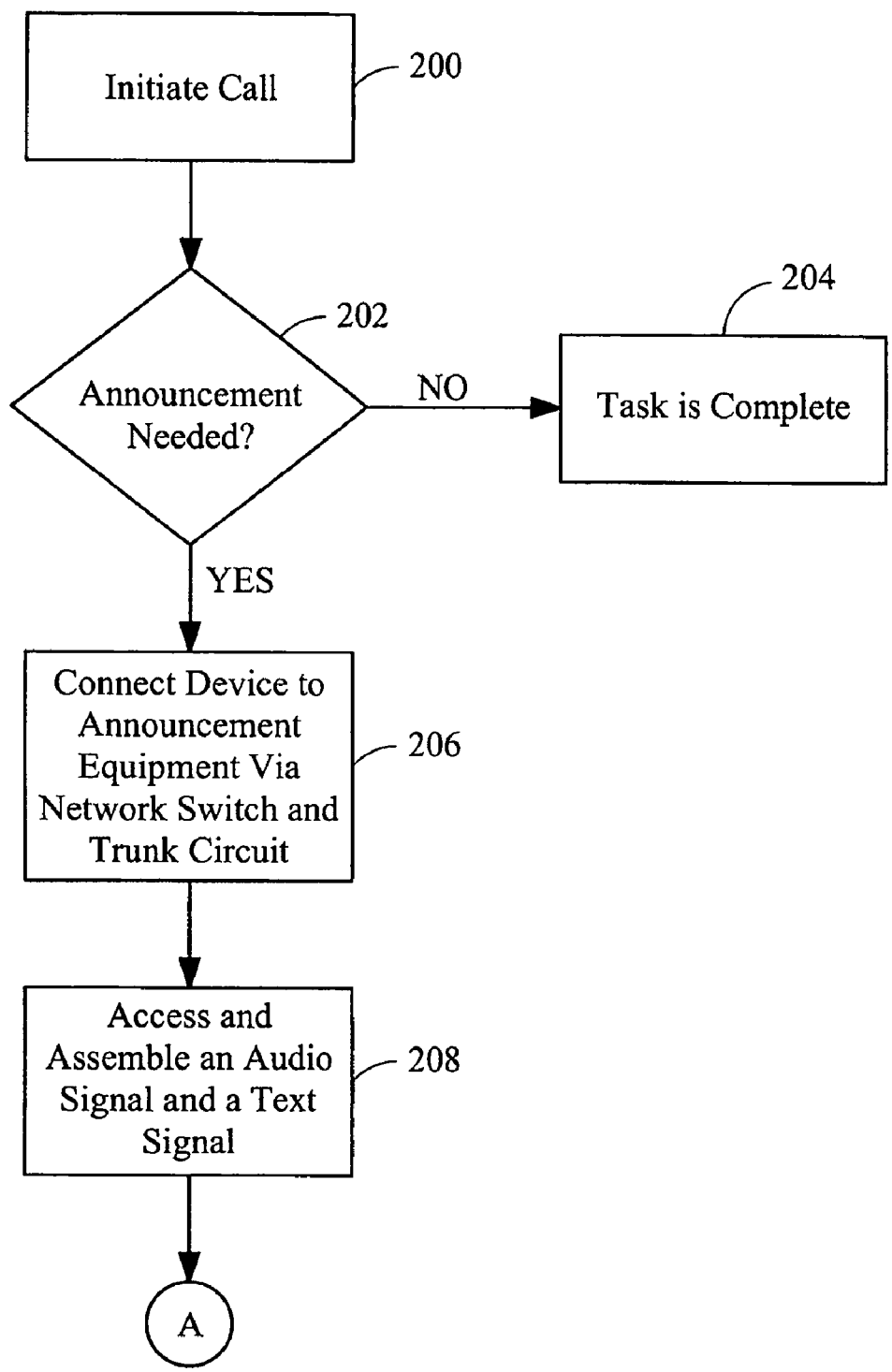
FIGS. 2a, 2b, and 2c are flowcharts illustrating a process performed by a telecommunications system according to one embodiment of the present invention.
Figure 2B:
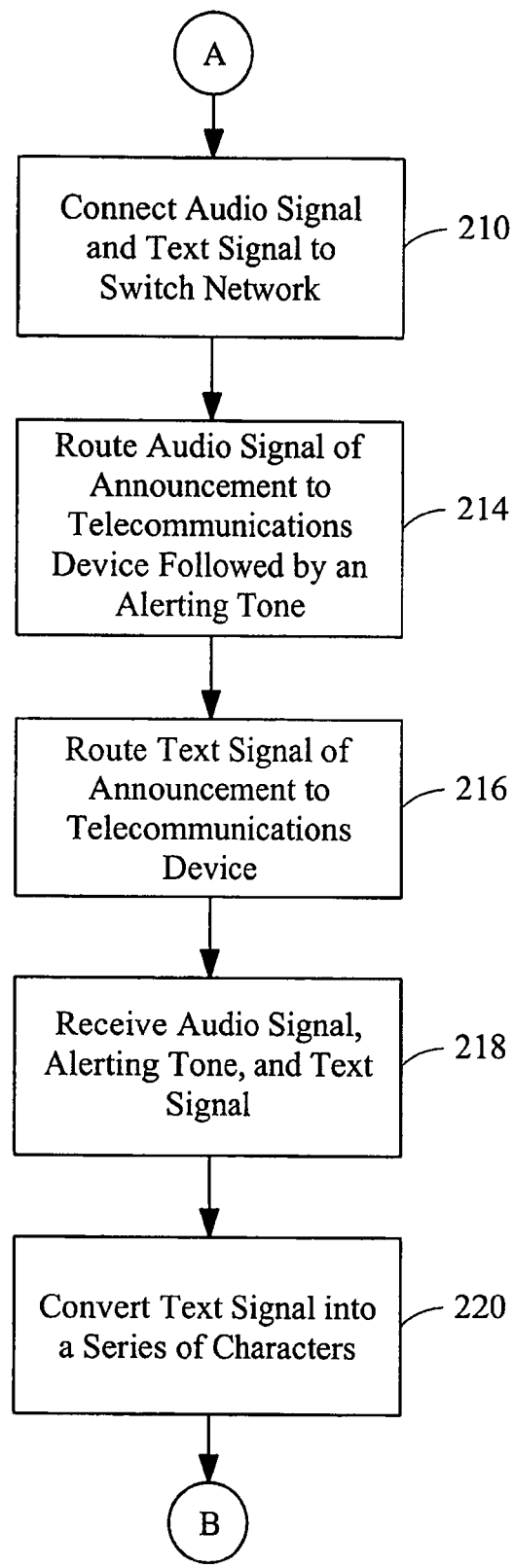
Figure 2C:
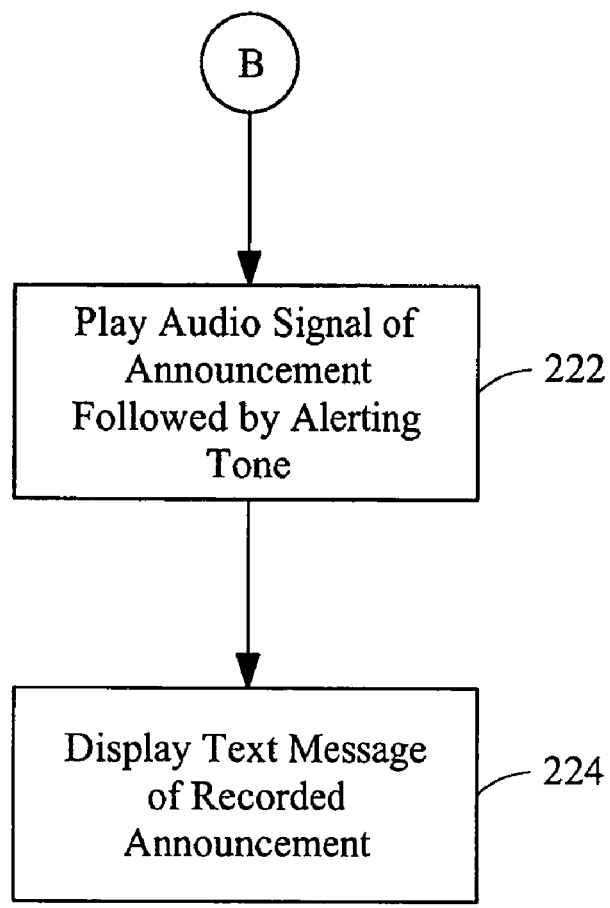

FIGS. 2a, 2b, and 2c are flowcharts illustrating an embodiment of a process performed by telecommunications system 98 according to the present invention. At step 200, a party initiates a call using a telecommunications device 101, 102, 103. The process proceeds to step 202 where a central office (CO) processor 132 interprets the call scenario and determines whether an announcement is needed. If no announcement is needed, the task is complete at step 204 and no further action is required. If an announcement is needed, the process proceeds to step 206 where the CO processor 132 connects the telecommunications device 101, 102, 103 through the switch network 130 to a trunk circuit 140 that is in communication with recorded announcement equipment 150.

At step 208, the CO processor 132 accesses and assembles an audio signal and a text signal of the necessary recorded announcement from the available phrases that are stored in the recorded announcement equipment 150 and connects these signals, in step 210, to the switch network 130. The text signal may be, for example, a word-for-word representation of the audio signal or may be an abbreviated form of the audio signal.

At step 214, the switch network 130 may route the audio signal and text signal of the recorded announcement to the originating telecommunications device 101, 102, 103, and in one embodiment, the audio signal may include a tone that precedes the text signal and indicates to the telecommunications device 101, 102, 103 that a text message should be displayed.

At step 216, the switch network 130 may then route the text signal to the originating telecommunications device 101, 102, 103. The process then proceeds to step 218 where the telecommunications device 101, 102, 103 receives the audio signal, the alerting tone, and the text signal. At step 220, the telecommunications device 101, 102, 103 converts the text signal into a series of characters, and at step 222, audibly plays the recorded announcement followed by a tone that alerts the user of a text message and suspends audible presentation of the recorded announcement. The process then proceeds to step 224 where the telecommunications device 101, 102, 103 displays the text message of the recorded announcement.

In another embodiment of the present invention, the text signal may be stored and assembled along with the audio signal. In this embodiment, the text signal is delivered as an integral part of the announcement for all calls that require a recorded announcement.

Figure 3:
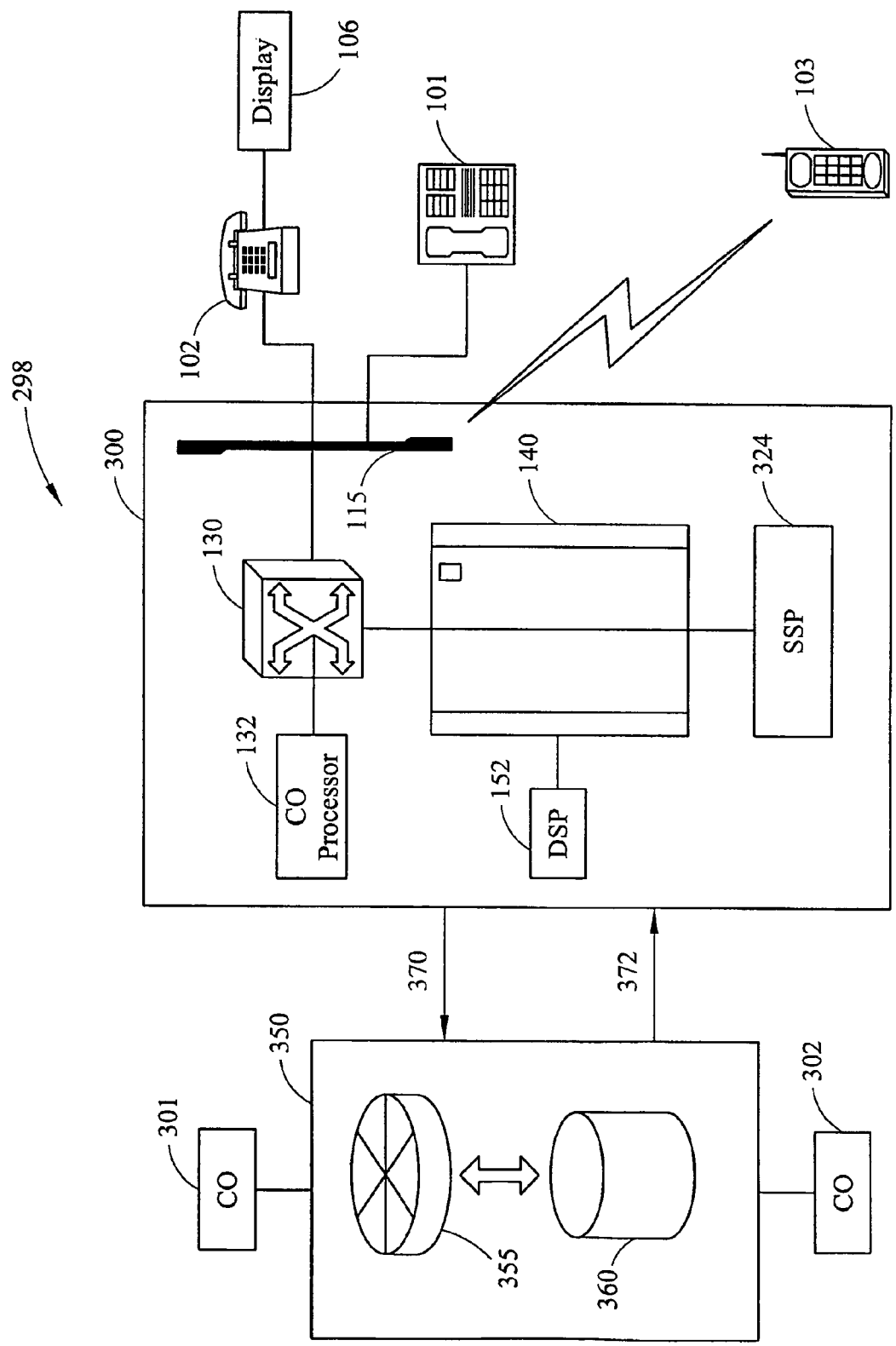
FIG. 3 is a block diagram of a system according to another embodiment of the present invention.
Figure 4A:
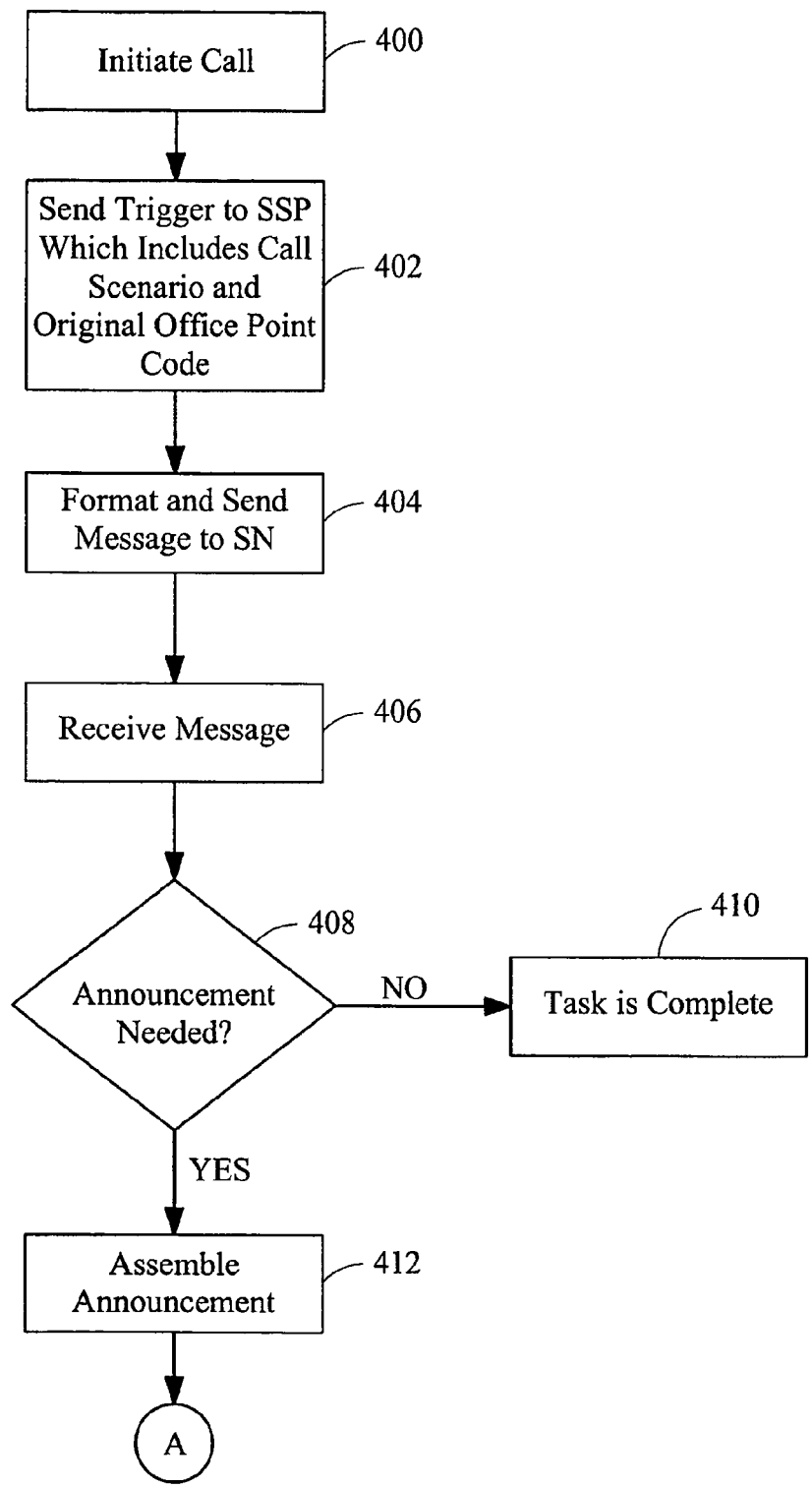
FIGS. 4a, 4b, 4c, and 4d are flowcharts illustrating a process performed by a telecommunications system according to one embodiment of the present invention.
Figure 4B:
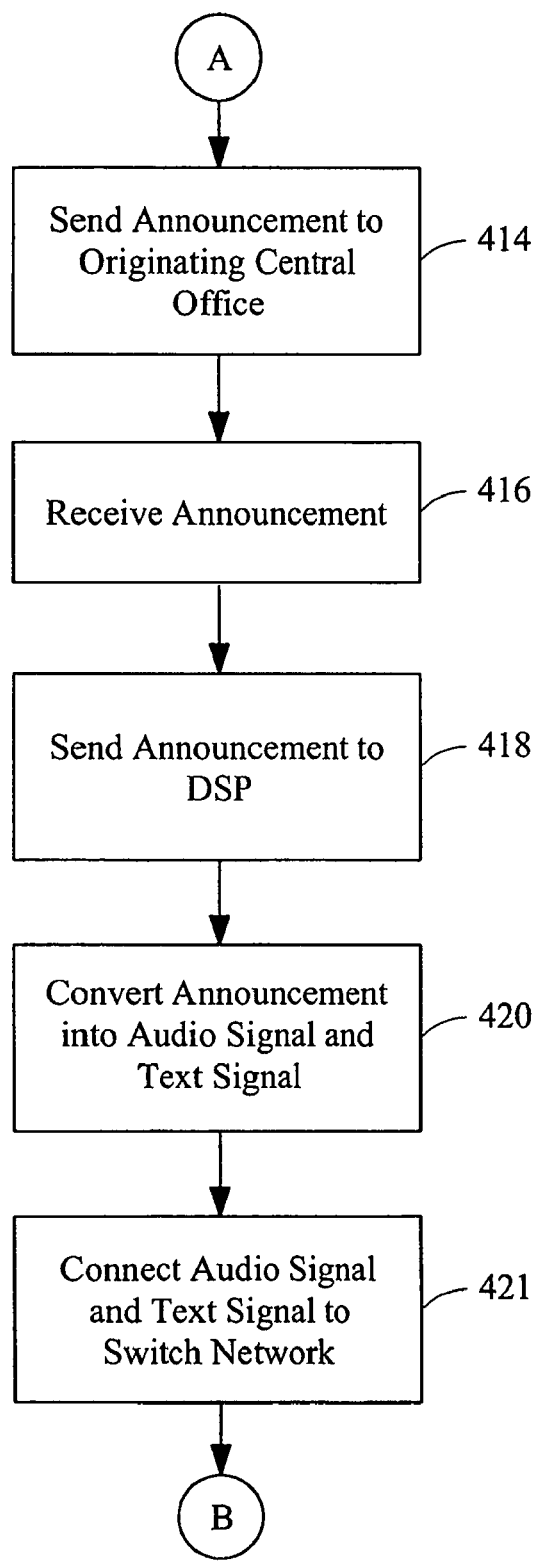
Figure 4C:
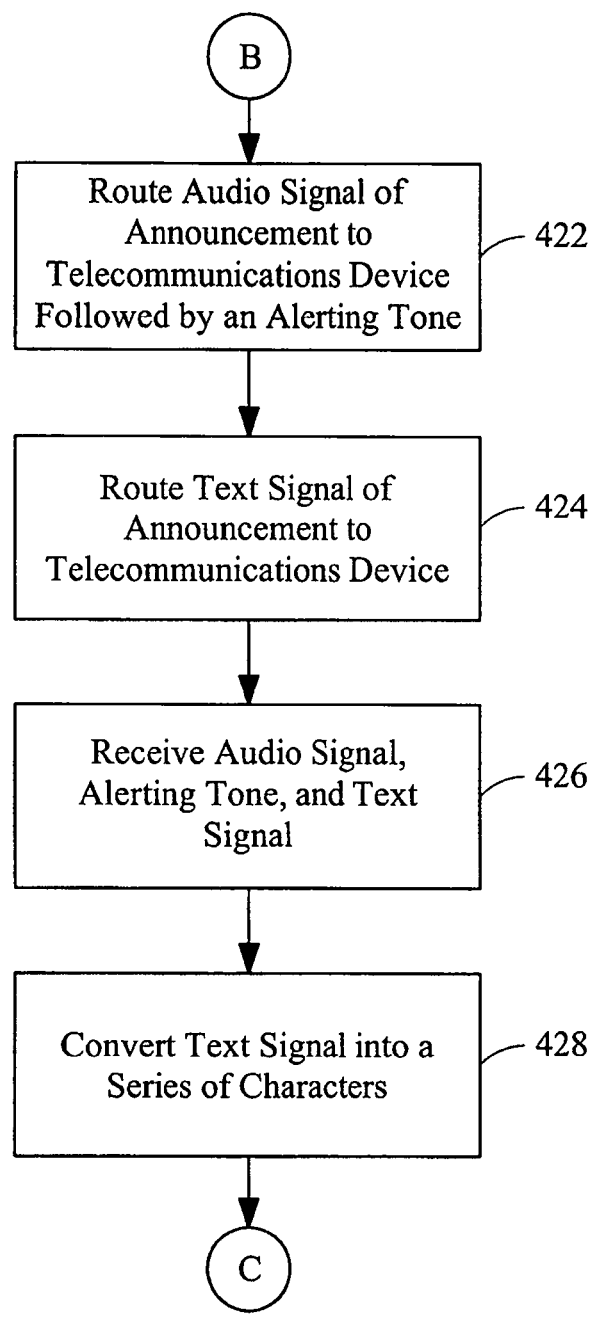
Figure 4D:
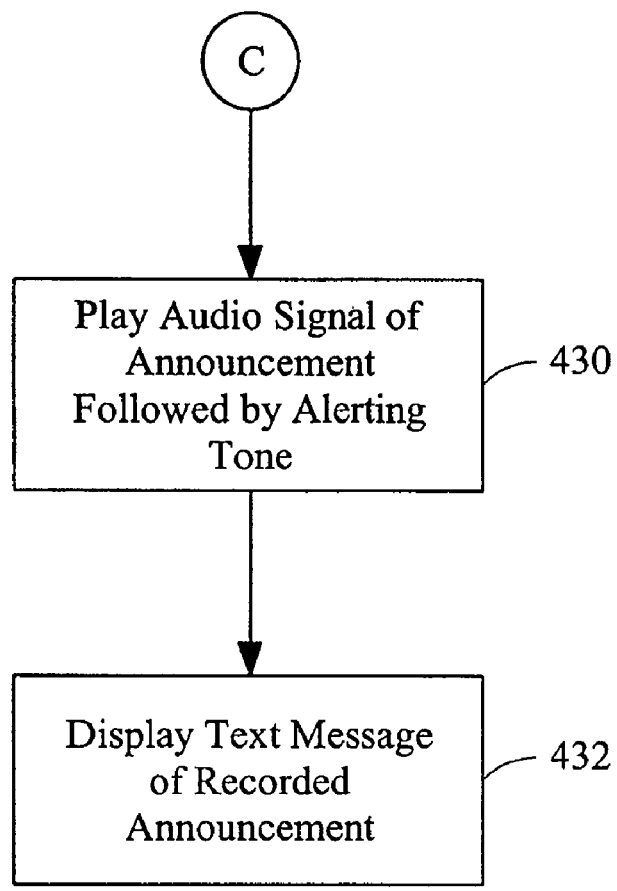

FIG. 3 is a block diagram of a telecommunications system 298 according to another embodiment of the present invention. Users of telecommunications devices 101, 102, 103 (e.g. subscribers to a telephone service provider, Intranet clients, employees of a company, members of a poll, and the like) are connected to a central office 300 via a distributing frame 115 into a switch network 130. Central office 300 is connected to one or more trunks 140 and a frame (not shown) that includes an announcement digital signal processor (DSP) 152 and a service switching point (SSP) 324. In turn, central office 300 is coupled to an announcement service node (SN) 350. Central office 300 serves as one central office on a local access transport area (LATA). Central offices 301, 302 are also part of the LATA and are coupled to service node 350.

Announcement service node 350 comprises a router 355 and data schema 360. Data schema 360 may be in the format of a relational database (e.g. Oracle® databases), Lightweight Directory Access Protocol (LDAP) or other data storage architectures. In this example, when a caller using telecommunications device 101 initiates a call on the network, a central office (CO) processor 132 sends a trigger to a service switching point (SSP) 324, which includes call scenario and originating office point code. For example, CO processor 132 may be located on or next to network switch 130, communicating with SSP 324 via trunk 140. SSP 324 may format a message 370 to send to announcement SN 350 via a communications link, which may be, for example, SS7 network links or a trunk circuit. U.S. Pat. No. 5,438,568, which is hereby incorporated by reference, discloses additional details regarding the communication between a central office and a service node and the overall functioning of an Advanced Intelligent Network (AIN).

In one embodiment of the present invention, announcement SN 350 executes programmable applications to determine whether an announcement is needed, and if an announcement is needed, the SN 350 accesses a database and assembles a recorded announcement from available phrases that are stored in the database. In addition, announcement SN 350 may then send the needed announcement in packet-size form 372 to the originating central office 300. At the originating central office, SSP 324 may receive the announcement and send the announcement to DSP 152. Announcement DSP 152 may take the packet-size file and convert it into an audio signal and a text signal and connect both the audio signal and the text signal to the switch network 130, via a trunk circuit 140. In another embodiment, SN 350 may store a text signal of the recorded announcement in addition to or in place of the audio signal, which the SSP 324 may access and connect to switch network 130.

The switch network 130 may then route the audio signal of the recorded announcement to telecommunications device 101, and, in one embodiment, the audio signal may include a tone that precedes the text signal and indicates to the telecommunications device 101 that a text message should be displayed. The switch network 130 may also route the text signal to telecommunications device 101 in which the telecommunications device 101 will receive and convert the signal into a series of characters, and ultimately display the signal as a text message representing the recorded announcement.

In addition, the provisioning of recorded announcements in an announcement service node (SN) is the subject of co-pending application Ser. No. 10/073,238 titled "System and Method for Providing Recorded Messages on a Communications Network", which is hereby incorporated by reference in its entirety.

FIGS. 4a, 4b, 4c, and 4d are flowcharts illustrating an embodiment of a process performed by telecommunications system 298 according to the present invention. At step 400, a party initiates a call using a telecommunications device 101, 102, 103. The process proceeds to step 402 where a central office (CO) processor 132 sends a trigger, which includes call scenario and originating office point code, to a service switching point (SSP) 324. In step 404, the SSP 324 formats a message and sends the formatted message 370 to an announcement service node (SN) 350.

At the announcement SN 350, in step 406, an announcement SCP (not shown in FIG. 3) receives the message 370. In step 408, the announcement SCP interprets the call scenario and determines if an announcement is needed. If no announcement is needed, the task is complete at step 410 and no further action is required. If an announcement is needed, the process proceeds to step 412 where the announcement is assembled from available phrases that are stored in a relational database 360. At step 414, the announcement 372 is sent to the originating central office 300.

At the originating central office 300, in step 416, the central office SSP 324 receives the announcement 372 and, in step 418, sends the message to an announcement DSP 152. At step 420, the announcement DSP 152 may convert the message to an audio signal and a text signal and, in step 421, the DSP 152 connects both the audio signal and the text signal to the switch network 130. In another embodiment, SN 350 may store a text signal of the recorded announcement in addition to or in place of the audio signal, which the SSP 324 may access and connect to switch network 130.

At step 422, the switch network 130 may route the audio signal of the recorded announcement to the originating telecommunications device 101, 102, 103, and, in one embodiment, the audio signal may include a tone that precedes the text signal and indicates to the telecommunications device 101 that a text message should be displayed.

At step 424, the switch network 130 may then route the text signal to the originating telecommunications device 101, 102, 103. The process then proceeds to step 426 where the telecommunications device 101, 102, 103 receives the audio signal, the alerting tone, and the text signal. At step 428, the telecommunications device 101, 102, 103 converts the text signal into a series of characters, and at step 430, audibly plays the recorded announcement followed by a tone that alerts the user of a text message and suspends audible presentation of the recorded announcement. The process proceeds to step 432 where the telecommunications device 101, 102, 103 displays the text message of the recorded announcement.

It can be understood that there are many variations of the processes illustrated in FIGS. 2a, 2b, and 2c and FIGS. 4a, 4b, 4c, and 4d. For example, in lieu of converting the announcement into, for example, a frequency shift keyed (FSK) modulated signal, the DSP 152 or the recorded announcement equipment 150 may convert the announcement into, for example, a short message service (SMS) format or a multimedia message service (MMS). Another variation may entail the text signal being stored, accessed, and assembled along with the audio signal as opposed to being stored, accessed, and assembled separate from the audio signal. In such an embodiment, the text signal would be delivered as an integral part of the announcement for all calls that require a recorded announcement.

The various methods described hereinabove may be implemented on any type of suitable computer hardware, computer software, or combinations thereof. For example, the methods may be implemented in computer software using any suitable computer software language type such as, for example, C or C++ using, for example, conventional or object-oriented techniques. Such software may be stored on any type of suitable computer-readable medium or media such as, for example, a magnetic or optical storage medium.

Figure 5:
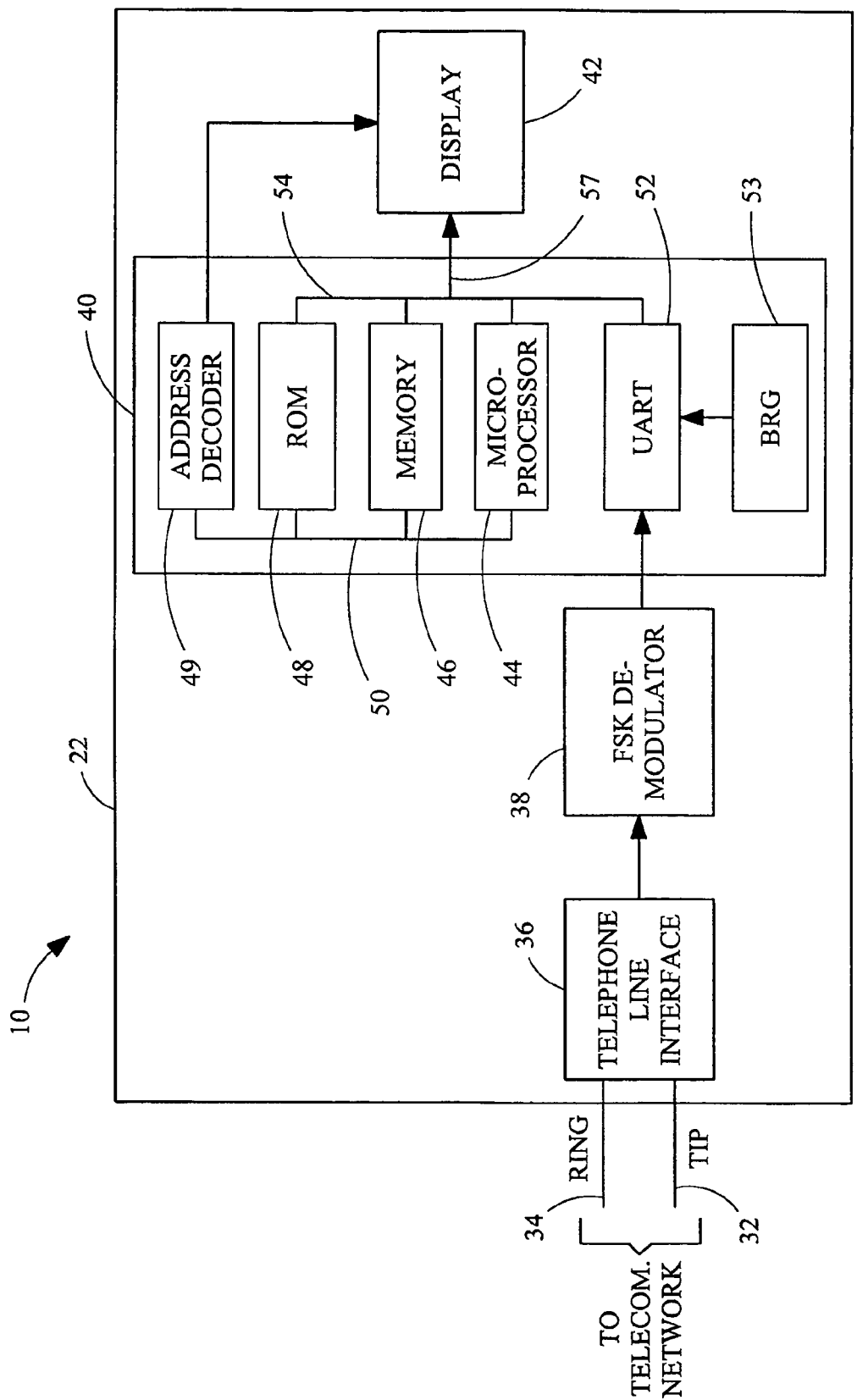
FIG. 5 is a block diagram of a telecommunications device according to one embodiment of the present invention.

FIG. 5 is a block diagram of a telecommunications device 10 that is capable of displaying a text message according to one embodiment of the present invention. The telecommunications device 10 may be, for example, a wireline telephone such as telephones 101, 102, or a digital wireless telephone (DWT) such as telephone 103, which can function in a digital wireless communication system (e.g. a TDMA system or a CDMA system). A telecommunications device capable of displaying a text message can include, for example, a telephone line interface circuit 36, a demodulator circuit 38, a control circuit 40 and an alphanumeric display 42. The control circuit 40 can be a single chip computer or can be implemented using discrete integrated circuits depending on the specific application. The control circuit 40 includes, in the most general sense, a microprocessor 44, a memory circuit 46 and a read only memory circuit 48 (ROM). The control circuit 40 also includes a universal asynchronous receiver transmitter 52 (UART) and a baud rate generator 53. Also included are an address bus 50 and a data bus 54 for interconnecting the various units as shown and an address decoder 49 for selecting various peripheral devices that the control circuit 40 interfaces with such as, for example, the alphanumeric display 42.

In operation, the telecommunications device may receive a FSK modulated signal from the central office switch. The FSK modulated signal contains, for example, a channel seizure stream that is followed by a mark stream and then the actual text announcement information. Additional data include, for example, single bit markers that are interpreted for display.

The FSK modulated signal is received at the tip 32 and ring 34 side of the telephone line. These signals are then passed through the telephone line interface circuit 36 where they are filtered and amplified. The filtered and amplified signals are then coupled to the FSK demodulator circuit 38 where the modulated signals are converted to a serial bit stream representation of the text message. The serial bit stream is then fed to the UART 52, which converts the serial bit stream into a parallel bit format. The parallel bit formatted stream is interpreted as a series of characters comprising the text announcement data by the microprocessor 44. The microprocessor 44 then periodically updates the alphanumeric display 42 with each character comprising the parallel bit formatted stream.

U.S. Pat. No. 4,582,956 discloses additional details regarding a telecommunications device receiving and displaying a text message and is hereby incorporated by reference in its entirety.

It can be understood by those skilled in the art that there are many variations of the telecommunications device described in FIG. 5. For example, the alphanumeric display 42 can either be an integral component of the telecommunications device 101, or the display can be a separate accessory 106 that attaches to the telecommunications device 102. Also, microprocessor 44 may be programmed to immediately display the text message after the telecommunications device receives an altering tone or the microprocessor may be programmed only to display the text message only after the user presses a key on the keypad of the telecommunications device.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

Therefore, at least the following is claimed:

1. A network switch, comprising:
   communications logic configured to facilitate communication with a communications device over a telecommunications network; and
   a first processor coupled to the communications logic, the first processor configured to perform at least the following during a telephone call to the communications device over the telecommunications network:
   route a recorded announcement to the communications device, wherein the recorded announcement is stored as an audio signal of a voice file which represents spoken words of the recorded announcement;
   route an alerting tone to the communications device, the alerting tone configured to indicate that a text message will be sent; and route the text message to the communications device, after routing the recorded announcement to the communications device, wherein the recorded announcement is audibly presented followed by presentation of the alerting tone, followed by presentation of the text message, where audible presentation of the recorded announcement is suspended for presentation of the alerting tone, wherein the audio signal comprises a Frequency Shift Keying (FSK) signal of ASCII (American Standard Code for Information Interchange) binary characters that represent the text message of the recorded announcement and that are capable of being displayed by the communications device in the form of a text message, wherein the text message for the recorded announcement is stored in its entirety with the recorded announcement or separately from it.

2. The network switch of claim 1, wherein the communications device is selected from a group that includes a wireless telephone and a wireline telephone.

3. The network switch of claim 1, wherein the network switch is in communication with a device for storing the recorded announcement and wherein the device for storing the recorded announcement includes a plurality of recorded announcements and a plurality of phrases of the plurality of recorded announcements.

4. The network switch of claim 3, wherein the device for storing the recorded announcement is in communication with a second processor and wherein the second processor executes a set of instructions to convert the recorded announcement into the frequency shift keyed (FSK) modulated signal and to transmit, to the network switch, the frequency shift keyed (FSK) modulated signal.

5. The network switch of claim 1, wherein the recorded announcement is stored separately from the text message.

6. The network switch of claim 1, wherein the recorded announcement is stored together with the text message.

7. The network switch of claim 1, wherein the communications device is configured to receive the text message and display the text message.

8. The network switch of claim 1, wherein the communications device is configured to convert the text message into a series of characters for display.

9. The network switch of claim 1, wherein the communications device is configured to operate in a digital wireless system.

10. The network switch of claim 9, wherein the digital wireless system includes at least one of the following: a time division multiple access (TDMA) system and a code division multiple access (CDMA) system.

11. A computer-implemented method, comprising
routing, by a switch, a recorded announcement to a communications device over a telecommunications network, wherein the recorded announcement is stored as an audio signal of a voice file which represents spoken words of the recorded announcement;
routing an alerting tone to the communications device, the alerting tone configured to indicate that a text message will be sent; and
routing the text message to the communications device, after routing the recorded announcement to the communications device, wherein the recorded announcement is audibly presented followed by presentation of the alerting tone, followed by presentation of the text message during a telephone call to the communications device over the telecommunications network, where audible presentation of the recorded announcement is suspended for presentation of the alerting tone, wherein the audio signal comprises a Frequency Shift Keying (FSK) signal of ASCII (American Standard Code for Information Interchange) binary characters that represent the text message of the recorded announcement and that are capable of being displayed by the communications device in the form of a text message, wherein the text message for the recorded announcement is stored in its entirety with the recorded announcement or separately from it.

12. The computer-implemented method of claim 11, further comprising storing the recorded announcement, wherein the recorded announcement includes a plurality of recorded announcements and a plurality of phrases of the plurality of recorded announcements.

13. The computer-implemented method of claim 11, further comprising executing a set of instructions to convert the recorded announcement into the frequency shift keyed (FSK) modulated signal and to transmit the frequency shift keyed (FSK) modulated signal.

14. The computer-implemented method of claim 11 wherein the recorded announcement is stored accordingly to at least one of the following: separately from the text message and together with the text message.

15. The computer-implemented method of claim 11, wherein the communications device is configured to receive the text message and display the text message.

16. The computer-implemented method of claim 11, wherein the communications device is configured to convert the text message into a series of characters for display.

17. The computer-implemented method of claim 11, wherein the communications device is configured to operate in a digital wireless system, wherein the digital wireless system includes a time division multiple access (TDMA) system, and wherein the digital wireless system includes a code division multiple access (CDMA) system.

18. A non-transitory computer-readable medium that stores a program that, when executed by a computer, causes the computer to perform at least the following:
route a recorded announcement to a communications device over a telecommunications network, wherein the recorded announcement is stored as an audio signal of a voice file which represents spoken words of the recorded announcement;
route an alerting tone to the communications device, the alerting tone configured to indicate that a text message will be sent; and
route the text message to the communications device, after routing the recorded announcement to the communications device, wherein the recorded announcement is audibly presented followed by presentation of the alerting tone, followed by presentation of the text message during a telephone call to the communications device over the telecommunications network, where audible presentation of the recorded announcement is suspended for presentation of the alerting tone, wherein the audio signal comprises a Frequency Shift Keying (FSK) signal of ASCII (American Standard Code for Information Interchange) binary characters that represent the text message of the recorded announcement and that are capable of being displayed by the communications device in the form of a text message, wherein the text message for the recorded announcement is stored in its entirety with the recorded announcement or separately from it.

19. The non-transitory computer-readable medium of claim 18, wherein the program is further configured to cause the computer to convert the recorded announcement into the frequency shift keyed (FSK) modulated signal and to transmit the frequency shift keyed (FSK) modulated signal.

20. The non-transitory computer-readable medium of claim 18, wherein the program is further configured cause the computer to determine whether the recorded announcement is needed and, in response to a determination that the recorded announcement is needed, assembling the recorded announcement from a plurality of words that are stored in a database.

* * * * *